US009976541B2

(12) United States Patent
Smith

(10) Patent No.: US 9,976,541 B2
(45) Date of Patent: May 22, 2018

(54) TURBINE MAIN BEARING LUBRICATION

(71) Applicant: Romax Technology Limited, Nottingham (GB)

(72) Inventor: Richard Smith, Nottingham (GB)

(73) Assignee: INSIGHT ANALYTICS SOLUTIONS HOLDINGS LIMITED, Nottingham (GB)

( * ) Notice: Subject to any disclaimer, the term of this patent is extended or adjusted under 35 U.S.C. 154(b) by 462 days.

(21) Appl. No.: 14/266,655

(22) Filed: Apr. 30, 2014

(65) Prior Publication Data

US 2014/0294586 A1 Oct. 2, 2014
US 2016/0377061 A9 Dec. 29, 2016

(51) Int. Cl.
*F03D 11/04* (2006.01)
*F03D 80/70* (2016.01)
*F03D 80/50* (2016.01)
*F16C 33/66* (2006.01)

(52) U.S. Cl.
CPC ............ *F03D 80/70* (2016.05); *F03D 80/50* (2016.05); *F16C 33/6637* (2013.01); *F05B 2230/80* (2013.01); *F05B 2260/98* (2013.01); *Y02E 10/72* (2013.01); *Y02E 10/722* (2013.01); *Y10T 29/49318* (2015.01)

(58) Field of Classification Search
CPC ...... F03D 1/003; F03D 80/70; F05B 2230/80; F05B 2260/98; Y02E 10/722; Y10T 29/49318
USPC ........................................................ 416/174
See application file for complete search history.

(56) References Cited

U.S. PATENT DOCUMENTS 4,046,486 A * 9/1977 Kolb ...................... F04D 29/362
416/146 A
4,186,975 A * 2/1980 Schwarz ................. B64C 27/54
384/465

(Continued)

FOREIGN PATENT DOCUMENTS

JP CA 2669050 A1 * 2/2010 .............. F16C 19/38

Primary Examiner — William McCalister
(74) Attorney, Agent, or Firm — David D. Brush; Westman, Champlin & Koehler, P.A.

(57) ABSTRACT

A greased-based lubrication system for a main bearing arrangement of a wind turbine can be replaced with an oil-based lubrication system by: disconnecting an upwind bearing cover 12 and/or a downwind bearing cover 12 from the bearing housing 10; cleaning grease from the bearing arrangement; connecting an upwind oil drain cover 14 to the upwind side of the bearing housing 10; and connecting a downwind oil drain cover 14 to the downwind side of the bearing housing 10. At least one of the upwind oil drain cover 14 and the downwind oil drain cover 14 include one or more outlets for an oil-based lubricant. Further steps include: connecting the one or more outlets to an oil-based lubrication system; and introducing oil-based lubricant into the bearing arrangement. This means that the greased-based lubrication system, in which debris from bearing wear accumulates and does not escape from the bearing, contributing to further wear and damage can be replaced with an oil-based lubrication system, in which the quality of the lubricant can be monitored, its temperature can be controlled, and debris can be removed by filtration. The invention also includes an oil drain cover 14.

5 Claims, 4 Drawing Sheets

(56) References Cited

U.S. PATENT DOCUMENTS

| | | | | |
|---|---|---|---|---|
| 8,727,728 B2* | 5/2014 | Wadehn | ............... | F03D 80/70 416/174 |
| 2008/0001469 A1* | 1/2008 | Deegear | ............... | B60B 7/0013 301/108.1 |
| 2010/0129223 A1* | 5/2010 | Benito Santiago | ..... | F16C 33/10 416/174 |
| 2012/0134831 A1* | 5/2012 | Tiscareno | ............... | F16C 19/08 416/174 |
| 2012/0170879 A1* | 7/2012 | Bauer | ............... | F03D 80/00 384/91 |
| 2012/0282100 A1* | 11/2012 | Omoto | ............... | F16C 33/513 416/174 |

\* cited by examiner

US 9,976,541 B2

TURBINE MAIN BEARING LUBRICATION

CROSS-REFERENCE TO RELATED APPLICATIONS

This application claims the benefit of U.K. Patent Application No. GB1307794.6 filed Apr. 30, 2013.

BACKGROUND OF THE INVENTION

The present invention relates to improvements to the lubrication of wind turbine main bearings. In particular it relates to the replacement of a greased-based lubrication system with an oil-based lubrication system.

BRIEF SUMMARY OF THE INVENTION

Wind or water turbine main bearing are typically formed of roller bearings. Effective lubrication difficult to achieve because of the slow rotation speeds of the rotor and the wide ranges of operating temperature. Grease lubrication is widely used for such bearings, and its consistency prevents it from leaking out of the bearing, makes it easy to use, and gives it good sealing properties. However the grease pack is quite big, and does not move around within the bearing arrangement under typical turbine operating conditions. This means that debris from bearing wear does not escape from the bearing, and will contribute to further wear and damage.

Oil lubrication avoids these latter problems, because the quality of the lubricant can be monitored, its temperature can be controlled, and debris can be removed by filtration.

The present invention provides apparatus and methods for replacing an existing grease-based main bearing system with an oil-based main bearing lubrication system. The invention also allows an oil-based lubrication system to be retrofitted to a turbine main bearing having grease-based lubrication.

According to a first aspect of the invention there is provided a method for replacing a greased-based lubrication system for a main bearing arrangement of a wind turbine. The main bearing arrangement is supported in a bearing housing having an upwind bearing cover and a downwind bearing cover. A downwind bearing cover and an upwind bearing cover are respectively attached at a downwind side and an upwind wind side of the bearing housing, forming a structure for retaining a lubricant. The method comprising the steps of: disconnecting the upwind bearing cover and/or the downwind bearing cover from the bearing housing; cleaning grease from the bearing arrangement and from the structure for retaining lubricant; connecting an upwind oil drain cover to the upwind side of the bearing housing; and connecting a downwind oil drain cover to the downwind side of the bearing housing. At least one of the upwind oil drain cover and the downwind oil drain cover include one or more outlets for an oil-based lubricant. The method further comprising the steps of: connecting the one or more outlets to an oil-based lubrication system; and introducing oil-based lubricant into the bearing arrangement. This means that the greased-based lubrication system, in which debris from bearing wear accumulates and does not escape from the bearing, contributing to further wear and damage can be replaced with an oil-based lubrication system, in which the quality of the lubricant can be monitored, its temperature can be controlled, and debris can be removed by filtration.

Preferably, the method further includes the steps of: forming one or more inlets in the bearing housing for the oil-based lubricant; connecting the one or more inlets to an oil-based lubrication system; and recirculating oil-based lubricant around the bearing arrangement. This means that the oil-based lubricant can be introduced into the bearing arrangement using pre-existing inlets for grease, or new inlets can be created by, for example, drilling into the housing.

Preferably, at least one of the upwind oil drain cover and the downwind oil drain cover includes one or more inlets for an oil-based lubricant, the method further comprising the steps of: connecting the one or more inlets to an oil-based lubrication system; and recirculating oil-based lubricant around the bearing arrangement. This means that the oil-based lubricant can be introduced into the bearing arrangement via the downwind and/or upwind oil drain covers.

Preferably, the upwind oil drain cover and the downwind oil drain cover are annular, and include oil-based lubricant seals on their radially inner surfaces. This means that they are able to form a seal against the bearing housing and prevent leakage of oil.

Preferably, the method includes a further step of: connecting the upwind bearing cover to the upwind oil drain cover. The method preferably includes a further step of: connecting the downwind bearing cover to the downwind oil drain cover. This means that the existing bearing covers can be utilised to facilitate connections to other components of the bearing arrangement.

According to a further aspect of the invention, there is provided an oil drain cover for fitment to a greased-based lubrication system for a main bearing arrangement of a wind turbine. The main bearing arrangement is supported in a bearing housing having an upwind bearing cover and a downwind bearing cover. A downwind bearing cover and an upwind bearing cover are respectively attached at a downwind side and an upwind wind side of the bearing housing, forming a structure for retaining a lubricant. The oil drain cover is annular, and includes: means for connecting the oil drain cover to the bearing housing; and one or more conduits for an oil-based lubricant, the conduits passing radially through the cover between a radially inner surface and a radially outer surface. The oil cover can be used in the replacement of an existing greased-based lubrication system, and can be connected to an oil-based lubrication system. This means that debris from bearing wear, which accumulates in the grease and contributes to further wear and damage, can be removed by filtration.

Preferably, the oil drain cover further includes means for connecting the oil drain cover to the bearing cover. This means that the existing bearing covers can be utilised to facilitate connections to other components of the bearing arrangement.

Preferably, the oil drain cover further includes means for attaching an oil-based lubricant seal to a radially inner surface and/or to a radially outer surface. This means that they are able to form a seal against the bearing housing and prevent leakage of oil.

DETAILED DESCRIPTION OF THE INVENTION

The term "greased" refers to a lubricant which is thick and viscous and is generally difficult to pump and the term "oil" refers to a lubricant which is a liquid of much lower viscosity and is generally easy to pump. The grease or the oil can be synthetic, semi-synthetic, or natural.

Figure 1:
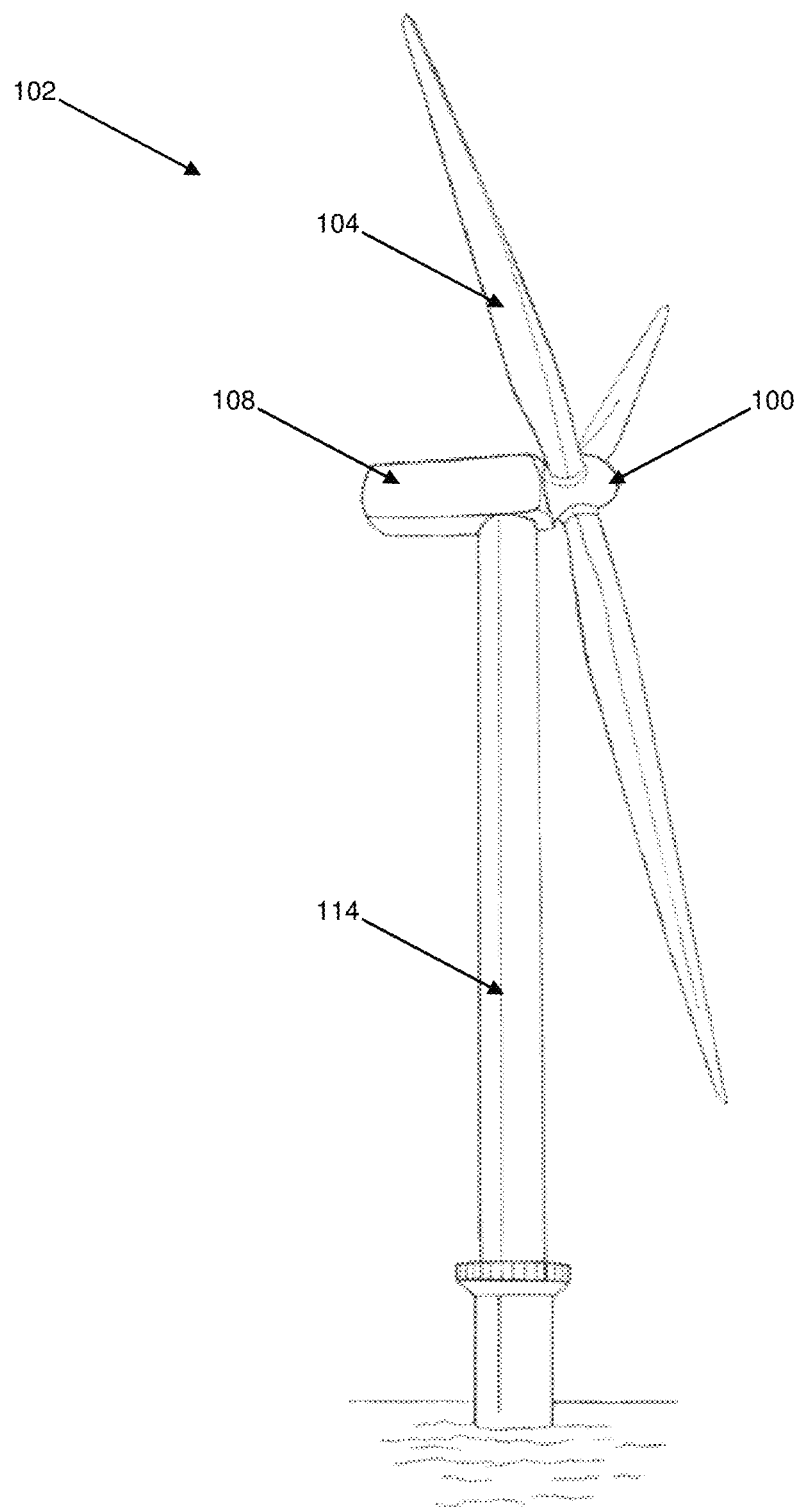
FIG. 1 shows an external view of an offshore wind turbine.

FIG. 1 is a perspective view of an example of a wind turbine. Although an offshore wind turbine is shown, it should be noted that the description below may be applicable to other types of wind turbines. The wind turbine 102 includes rotor blades 104 mounted to a hub 100, which is supported by a nacelle 108 on a tower 114. Wind causes the rotor blades 104 and hub 106 to rotate about a main axis.

Rotational energy from hub 106 is delivered to a power transmission system comprising a gearbox and/or a generator housed within the nacelle 108 via a main shaft.

Figure 2A:
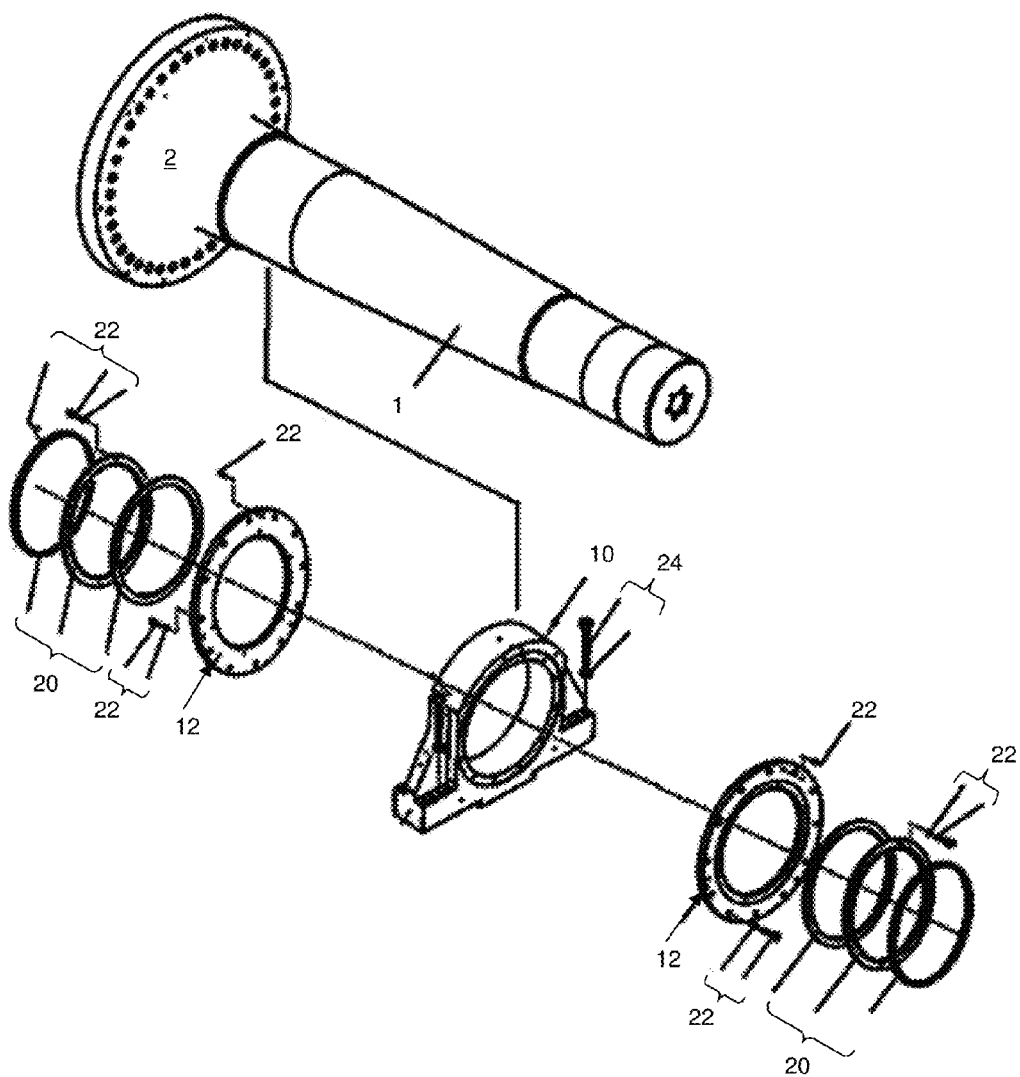
FIG. 2A shows an exploded view of a main bearing arrangement of a wind turbine.

FIG. 2A is an exploded view of a typical prior art main bearing arrangement of a wind turbine having grease-based lubrication, and shows a main shaft 1 which connects to rotor hub 100 via endplate 2. The main shaft is supported by the bearing arrangement within bearing housing 10. Bearing housing 10 is attached to a mainframe (not shown) via bolts 24. An upwind and a downwind bearing cover 12 and other components 20 are attached to bearing housing 10 via fastener means 22. It will be appreciated that when the main bearing assembly is dissembled, that although the various components can be moved axially along main shaft 1, they cannot be removed when main shaft 1 remains connected to the power transmission system, which may include a gearbox (not shown) and/or a generator (not shown). Grease can be replace, a method comprising the following steps is followed:

upwind and/or downwind bearing covers 12 are disconnected from bearing housing 10;

grease is cleaned from the bearing arrangement;

fresh grease is packed into the bearing arrangement; and upwind and/or downwind bearing covers 12 are reconnected to bearing housing 10.

Figure 2B:
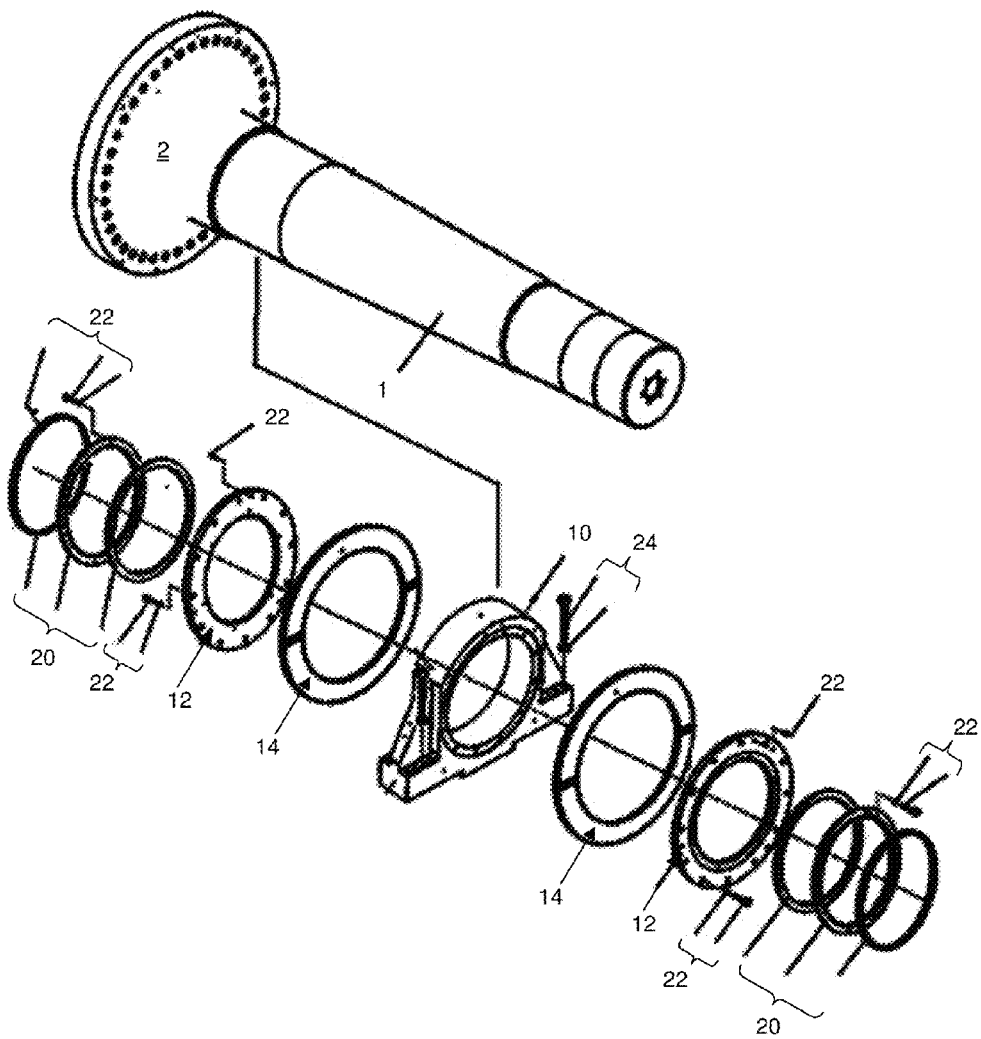
FIG. 2B shows an exploded view of a main bearing arrangement of a wind turbine having the oil drain covers of the present invention.

FIG. 2B is an exploded view of a typical prior art main bearing arrangement of a wind turbine having oil-based lubrication, and includes elements corresponding to those having the same labels as in FIG. 2A. In addition, it includes an upwind and downwind oil drain cover 14 attached between bearing housing 10 and respective upwind and a downwind bearing cover 12 via fastener means. Each oil drain cover 14 is formed of multipart components (a two-part oil drain cover 14 is shown in FIG. 2B), so that when the main bearing is disassembled, although the various components cannot be removed when main shaft 1 remains connected to the power transmission system, each oil drain cover 14 can be assembled in situ around main shaft 1 and slid axially into the required position.

For retrofitting an oil-based lubrication system to an existing grease-based lubrication system, one or both of the upwind and downwind bearing covers 12 are disconnected from bearing housing 10 and grease is cleaned from the bearing arrangement as described above. The inventive approach of the present invention utilises one or both upwind and downwind oil drain covers 14, and the retrofitting process continues according to the step of: connecting one or both oil drain covers 14 to bearing housing 10. The connecting step involves placing the multiple parts of oil drain cover 14 around main shaft 1, and then joining the parts together to form oil drain cover 14.

Oil drain covers 14 can include one or more inlets/outlets for an oil-based lubricant, and the method further includes the following steps:

connecting the one or more inlets/outlets to an oil-based lubrication system; and introducing oil-based lubricant into the bearing arrangement.

This means that the oil-based lubricant can be introduced into the bearing arrangement via oil drain covers 14.

This means that the greased-based lubrication system, in which debris from bearing wear accumulates and contributes to further wear and damage is replaced with an oil-based lubrication system, in which the quality of the lubricant can be monitored, its temperature can be controlled, and debris can be removed by filtration. It also means there is less risk of operators slipping on greasy surfaces, as a problem associated with the grease repacking process is that there is a danger of grease being deposited on surfaces within the nacelle that an operator may walk on. With the approach of the present invention, once the greased-based lubrication system has been replaced with the oil-based lubrication system, the need to periodically repack the bearings with grease is removed.

The retrofitting process described above may also be achieved by removing only one bearing cover 12, removing the grease, and installing one oil drain cover 14. This embodiment may be particularly advantageous if access to the upwind bearing cover 12, for example, is restricted.

An alternative to utilising oil drain covers 14 including one or more inlets/outlets for an oil-based lubricant is to use existing inlets in bearing housing 10 for the oil-based lubricant, and oil drain covers 14 having outlets only can be used.

A further alternative to utilising oil drain covers 14 including one or more inlets/outlets for an oil-based lubricant is to form inlets in bearing housing 10 for the oil-based lubricant, and oil drain covers 14 having outlets only can be used.

This means that the oil-based lubricant can be introduced into the bearing arrangement using pre-existing inlets for grease, or new inlets can be created by, for example, drilling into bearing housing 10.

Similarly, new outlets can be created by, for example, drilling into bearing housing 10, and oil drain covers 14 having neither inlet nor outlets can be used.

In a further step, bearing covers 12 can be connected to oil drain covers 14. This means that existing bearing covers 12 can be utilised to facilitate connections to other components of the bearing arrangement.

Figure 3:
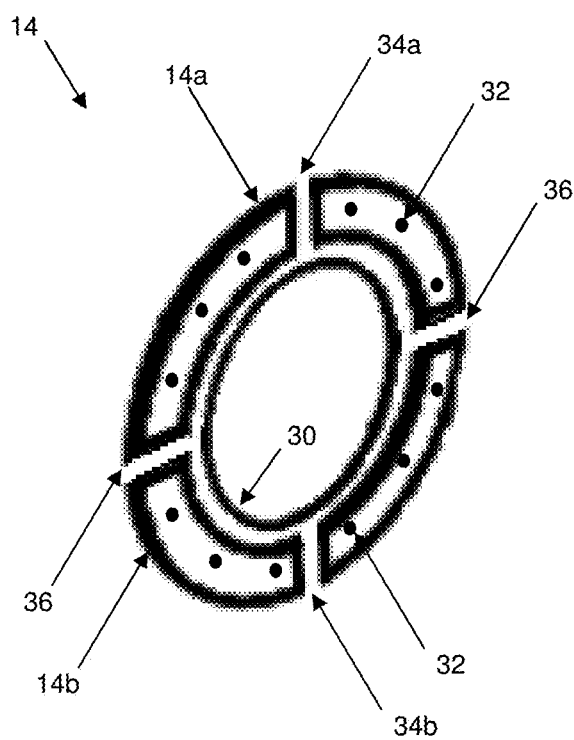
FIG. 3 shows an oil drain cover of the present invention.

FIG. 3 shows a multipart oil drain cover 14 comprised of two parts 14a,14b for use in retrofitting an oil-base lubrication system to a greased-based lubrication system in for main bearing arrangement of a wind turbine. Oil drain cover 14 is annular, and includes one or more seals for oil-based lubricant on its radially inner surface and/or to a radially outer surface. This means that a seal can be formed against the bearing housing or against main shaft 1 and prevent leakage of oil. A seal 30 on the radially inner surface is shown. Oil drain cover 14 also includes means 32 for connecting to bearing housing 10, typically holes and corresponding bolts. Means 32 for connecting to bearing housing 10 can also be used for connecting oil drain cover 14 to bearing cover 12. This means that existing bearing covers 12 can be utilised to facilitate connections to other components of the bearing arrangement. Oil drain cover 14 can also include one or more conduits 34a,34b for an oil-based lubricant, the conduits passing radially through oil drain cover 14 between a radially inner surface and a radially outer surface.

The invention further includes a wind turbine, having a main shaft 1 connecting to rotor hub 100 via endplate 2, in which main shaft 1 is supported by a bearing arrangement within bearing housing 10, the bearing arrangement including oil drain covers 14.

The invention claimed is:

1. A method for replacing a greased-based lubrication system for a main bearing arrangement of a wind turbine with an oil-based system, the main bearing arrangement being supported in a bearing housing having an upwind bearing cover and a downwind bearing cover, the downwind bearing cover and the upwind bearing cover being respectively attached at a downwind side and an upwind wind side of the bearing housing by fastener means;
   the method comprising the steps of:
   disconnecting one or both bearing covers from the bearing housing;
   cleaning grease from the bearing arrangement;
   connecting one oil drain cover to the bearing housing when one bearing cover has been disconnected or connecting two oil drain covers to the bearing housing when both bearing covers have been disconnected, the one or two drain covers comprised of at least two interconnecting parts for assembling around the main shaft;
   wherein at least one of the oil drain covers, bearing housing or bearing covers includes one or more inlets and outlets for an oil-based lubricant, the method further comprising:
   reconnecting the one bearing cover to the bearing housing when one bearing cover has been disconnected or reconnecting both bearing covers to the bearing housing when both bearing covers have been disconnected;
   connecting the one or more inlets to an oil-based lubrication system; and
   introducing oil-based lubricant into the bearing arrangement;
   thereby replacing the greased-based lubrication system with an oil-based lubrication system.

2. The method according to claim 1, further including the steps of:
   forming one or more inlets and/or outlets in the bearing housing for the oil-based lubricant;
   connecting the one or more inlets and/or outlets to an oil-based lubrication system; and
   recirculating oil-based lubricant around the bearing arrangement.

3. The method according to claim 1, the method further comprising the steps of:
   connecting the one or more inlets and/or outlets to an oil-based lubrication system; and
   recirculating oil-based lubricant around the bearing arrangement.

4. The method according to claim 1, in which the one or both drain covers each have a radially inner surface which is annular and each include oil-based lubricant seals on the radially inner surfaces.

5. The method according to claim 1, in which the step of reconnecting the one bearing cover to the bearing housing includes the step of:
   connecting the bearing cover to the oil drain cover.

* * * * *